US011308799B2

(12) United States Patent
Noel

(10) Patent No.: US 11,308,799 B2
(45) Date of Patent: *Apr. 19, 2022

(54) MONITORING AND REPORTING TRAFFIC INFORMATION

(71) Applicant: Melodie Noel, Norcross, GA (US)

(72) Inventor: Melodie Noel, Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/134,825

(22) Filed: Dec. 28, 2020

(65) Prior Publication Data

US 2021/0118290 A1    Apr. 22, 2021

Related U.S. Application Data

(63) Continuation of application No. 16/570,707, filed on Sep. 13, 2019, now Pat. No. 10,878,696, which is a
(Continued)

(51) Int. Cl.
*G08G 1/017*    (2006.01)
*G06K 9/00*    (2022.01)
(Continued)

(52) U.S. Cl.
CPC ....... *G08G 1/0175* (2013.01); *G06K 9/00798* (2013.01); *G06Q 50/26* (2013.01); *G08G 1/0133* (2013.01); *G08G 1/052* (2013.01)

(58) Field of Classification Search
CPC .... G08G 1/0175; G08G 1/0133; G08G 1/052; G08G 1/04; G06K 9/00798; G06K 9/00805; G06Q 50/26
See application file for complete search history.

(56) References Cited

U.S. PATENT DOCUMENTS

| 6,188,778 B1 | 2/2001 | Higashikubo et al. |
| 9,595,192 B1 | 3/2017 | Alrashid |
(Continued)

FOREIGN PATENT DOCUMENTS

| CA | 2 977 386 | 2/2018 |
| CN | 203 552 470 | 4/2014 |
(Continued)

OTHER PUBLICATIONS

Authorized officer Brigitta Klag, International Search Report and Written Opinion in PCT/US2019/052874 dated Dec. 19, 2019, 14 pages.
(Continued)

*Primary Examiner* — John R Schnurr
(74) *Attorney, Agent, or Firm* — Fish & Richardson P.C.

(57) ABSTRACT

Methods, systems, and apparatus, including computer programs encoded on a computer storage medium, for acquiring image data, determining that the user's vehicle is traveling in a left lane of a roadway having at least two lanes for travel in a first direction, detecting that a second vehicle is traveling within a predetermined distance in front of the user's vehicle and in the left lane of the roadway, obtaining speed information of the user's vehicle and the second vehicle at a first time and at a first location, determining, based on the obtained speed information, that a speed of the second vehicle at the first time is below a defined speed limit of the roadway at the first location, and in response triggering a potential violation procedure.

20 Claims, 12 Drawing Sheets

Related U.S. Application Data continuation of application No. 16/143,704, filed on Sep. 27, 2018, now Pat. No. 10,475,338.

(51) Int. Cl.
  *G06Q 50/26* (2012.01)
  *G08G 1/01* (2006.01)
  *G08G 1/052* (2006.01)

(56) References Cited

U.S. PATENT DOCUMENTS

| | | | |
|---|---|---|---|
| 9,679,487 B1* | 6/2017 | Hayward | H04Q 9/00 |
| 10,217,354 B1 | 2/2019 | Burke | |
| 2003/0214585 A1 | 11/2003 | Bakewell | |
| 2004/0193347 A1 | 9/2004 | Harumoto | |
| 2007/0213924 A1 | 9/2007 | Nagase | |
| 2010/0157061 A1 | 6/2010 | Katsman | |
| 2011/0128376 A1 | 6/2011 | Bortolotto | |
| 2011/0320492 A1 | 12/2011 | Inghelbrecht | |
| 2012/0284755 A1 | 11/2012 | Keret et al. | |
| 2012/0287278 A1 | 11/2012 | Danis | |
| 2014/0236464 A1 | 8/2014 | Gueziec | |
| 2014/0309864 A1 | 10/2014 | Ricci | |
| 2016/0363935 A1 | 12/2016 | Shuster | |
| 2017/0061788 A1 | 3/2017 | Burke | |
| 2017/0116851 A1 | 4/2017 | Burke | |
| 2017/0129501 A1 | 5/2017 | Lee | |
| 2017/0263120 A1 | 9/2017 | Durie, Jr. et al. | |
| 2017/0294117 A1* | 10/2017 | Burke | G06K 9/00791 |
| 2018/0130346 A1 | 5/2018 | Orris | |
| 2018/0137754 A1 | 5/2018 | Alon | |
| 2018/0148061 A1 | 5/2018 | Reckziegel | |
| 2018/0225961 A1 | 8/2018 | Okamura | |
| 2019/0064934 A1 | 2/2019 | McQuillen | |

FOREIGN PATENT DOCUMENTS

| | | |
|---|---|---|
| CN | C105 632 182 | 6/2016 |
| JP | 2005/40896 | 2/2005 |

OTHER PUBLICATIONS

PCT International Preliminary Report on Patentability in International Appln. No. PCT/US2019/052874, dated Apr. 8, 2021, 8 pages.

Indian Office Action in IN Appln. No. 2021127018275, dated Feb. 9, 2022, 16 pages.

* cited by examiner

MONITORING AND REPORTING TRAFFIC INFORMATION

CROSS-REFERENCE TO RELATED APPLICATION

This application is a continuation application of, and claims priority to, U.S. patent application Ser. No. 16/570,707, titled "MONITORING AND REPORTING TRAFFIC INFORMATION," filed on Sep. 13, 2019, which is a continuation application of, and claims priority to, U.S. patent application Ser. No. 16/143,704, titled "MONITORING AND REPORTING TRAFFIC INFORMATION," filed on Sep. 27, 2018. The disclosure of the foregoing applications are incorporated herein by reference.

BACKGROUND

Jurisdictions (e.g., states, counties, cities, etc.) have been implementing various versions of a "Slow Poke Law" that requires vehicles to remain at least at the speed limit when the vehicle is in the farthest left lane, sometimes referred to as a passing lane. The general principle behind these types of laws is to have slower vehicles on the right, and faster vehicles on the left. For example, when slow drivers linger in the left lane of multi-lane roads, a driver of a vehicle may be inclined to pass on the right, causing confusion and disorganization that can lead to accidents and traffic congestion. Moreover, one of the issues by drivers who violate a left lane slow poke law are many times unaware of the traffic congestion or potential accidents they may create by lingering in the left lane or passing lane.

SUMMARY

This specification describes technologies relating to systems and methods for monitoring and reporting traffic information. The subject matter provides an implementation of a vehicle monitoring application implemented on a device in a vehicle, such as mobile device, that provides traffic information to one or more servers.

In general, one innovative aspect of the subject matter described in this specification can be embodied in methods that include the actions of acquiring, by a camera of a user device, image data that depicts a view in a forward direction relative to the user's vehicle, determining, based on the image data, that the user's vehicle is traveling in a left lane of a roadway having at least two lanes for travel in a first direction, detecting that a second vehicle is traveling within a predetermined distance in front of the user's vehicle and in the left lane of the roadway, obtaining speed information of the user's vehicle and the second vehicle at a first time and at a first location, determining, based on the obtained speed information, that a speed of the second vehicle at the first time is below a defined speed limit of the roadway at the first location, and in response triggering a potential violation procedure, including detecting, after a predetermined amount of time, that the second vehicle is traveling within the predetermined distance in front of the user's vehicle and in the left lane of the roadway, obtaining speed information of the user's vehicle and the second vehicle at a second time at a second location, and determining that the speed of the second vehicle at the second time is below the defined speed limit of the roadway at the second location, and in response detecting, by the user device and based on the image data, a plate number of the second vehicle, and transmitting, to an application server, the speed information of the second vehicle at the first time, the speed information of the second vehicle at the second time, the plate number of the second vehicle, and the image data.

These and other aspects can each optionally include one or more of the following features.

In some examples, determining that the user's vehicle is traveling in the left lane of the roadway comprises determining, based on an object recognition process, that a particular roadway feature is positively identified from the image, and in response to positively identifying the particular roadway feature, determining that the user's vehicle is in the left lane based on a location of the particular roadway feature. In some examples, the particular roadway feature comprises at least one of a solid white line, double yellow lines, a guard rail, or a high occupancy vehicle (HOV) lane with double white lines.

In some examples, triggering a potential violation procedure further includes obtaining proximity data of surrounding vehicles that are within a defined area around the user's vehicle and traveling in the first direction of the roadway at the first time.

In some examples, detecting the plate number comprises detecting the plate number from a first image or a subsequently acquired image when the plate number is not detected in the first image.

In some examples, the image data includes a plurality of images, wherein each image includes location data and a timestamp.

In some examples, triggering the potential violation procedure further includes obtaining, after a predetermined amount of time, speed information of a first set of vehicles traveling in the first direction of the roadway that are within a defined area around the first location, and obtaining, after the predetermined amount of time, speed information of a second set vehicles traveling in the first direction of the roadway that are within a defined area around a second location.

In some examples, the method further includes determining, based on the speed information of the first set of vehicles and the second set of vehicles, that a traffic delay is occurring and is caused by the second vehicle, in response to determining the traffic delay has occurred, generating traffic delay information, the traffic delay information including, the speed information of the first set of vehicles and the second set of vehicles, the speed information of the second vehicle at the first time, the speed information of the second vehicle at the second time, the plate number of the second vehicle, and the image data, and transmitting, to a reporting agency server, the traffic delay information.

Other embodiments of this aspect can include corresponding systems, apparatus, and computer programs, configured to perform the actions of the methods, encoded on computer storage devices.

In general, another innovative aspect of the subject matter described in this specification can be embodied in a system that includes a data processing apparatus, and a non-transitory computer readable storage medium in data communication with the data processing apparatus and storing instructions executable by the data processing apparatus and upon such execution cause the data processing apparatus to perform operations. The operations include acquiring, by a camera of a user device, image data that depicts a view in a forward direction relative to the user's vehicle, determining, based on the image data, that the user's vehicle is traveling in a left lane of a roadway having at least two lanes for travel in a first direction, detecting that a second vehicle is traveling within a predetermined distance in front of the user's vehicle and in the left lane of the roadway, obtaining speed information of the user's vehicle and the second vehicle at a first time and at a first location, determining, based on the obtained speed information, that a speed of the second vehicle at the first time is below a defined speed limit of the roadway at the first location, and in response triggering a potential violation procedure, including detecting, after a predetermined amount of time, that the second vehicle is traveling within the predetermined distance in front of the user's vehicle and in the left lane of the roadway, obtaining speed information of the user's vehicle and the second vehicle at a second time at a second location, and determining that the speed of the second vehicle at the second time is below the defined speed limit of the roadway at the second location, and in response detecting, by the user device and based on the image data, a plate number of the second vehicle, and transmitting, to an application server, the speed information of the second vehicle at the first time, the speed information of the second vehicle at the second time, the plate number of the second vehicle, and the image data.

In general, another innovative aspect of the subject matter described in this specification can be embodied in a non-transitory computer storage medium encoded with a computer program, the computer program including instructions that when executed by a data processing apparatus cause the data processing apparatus to perform operations. The operations include acquiring, by a camera of a user device, image data that depicts a view in a forward direction relative to the user's vehicle, determining, based on the image data, that the user's vehicle is traveling in a left lane of a roadway having at least two lanes for travel in a first direction, detecting that a second vehicle is traveling within a predetermined distance in front of the user's vehicle and in the left lane of the roadway, obtaining speed information of the user's vehicle and the second vehicle at a first time and at a first location, determining, based on the obtained speed information, that a speed of the second vehicle at the first time is below a defined speed limit of the roadway at the first location, and in response triggering a potential violation procedure, including detecting, after a predetermined amount of time, that the second vehicle is traveling within the predetermined distance in front of the user's vehicle and in the left lane of the roadway, obtaining speed information of the user's vehicle and the second vehicle at a second time at a second location, and determining that the speed of the second vehicle at the second time is below the defined speed limit of the roadway at the second location, and in response detecting, by the user device and based on the image data, a plate number of the second vehicle, and transmitting, to an application server, the speed information of the second vehicle at the first time, the speed information of the second vehicle at the second time, the plate number of the second vehicle, and the image data.

Particular embodiments of the subject matter described in this specification can be implemented so as to realize one or more of the following advantages. The subject matter provides an implementation of a vehicle monitoring system that allows for the generation of more reliable and accurate reporting of potential traffic violations based on various data types and sources.

Systems and techniques described herein can recognize a vehicle that violates a particular traffic law from image data (e.g., a single frame image, continuous video, a stream of images, etc.) obtained from a camera of a mobile device within the vehicle. Once a vehicle has been identified, the mobile device can index the results. The vehicle monitoring application on the user device can determine if a second vehicle is traveling within a certain distance in front of the user's vehicle and whether they are traveling in a left lane before submitting various information (e.g., image data) to, or requesting information from, a server over a network. For example, as opposed to sending all image data to server to make these (or other) determinations, the mobile device can limit the amount of image data submitted to the server by only sending the image data when the second vehicle is traveling within a certain distance in front of the user's vehicle and the second vehicle is traveling in a left lane. Aggregated over many users, this reduced data transfer can significantly improve the functioning of a vehicle monitoring system by reducing the processing demands placed on the computers of that system (e.g., by reducing the amount of image data and other data that must be processed by one or more servers). As the vehicle monitoring system may be accessed over a network, reducing the number of requests can also reduce the amount of bandwidth consumed, allowing bandwidth for other network traffic and/or increasing the speed of the network.

Speed information can be obtained by way of a sensing device, such as a light detection and ranging (LIDAR) device, connected to the vehicle. This can prevent the user from having to make multiple requests to a server to obtain speed information, which, in turn, reduces the number of times computing system(s) process the requests to identify trigger a potential violation procedure.

In addition, in accordance with one or more embodiments, one or more sensing devices are connected to the vehicle for monitoring a plurality of other vehicles surrounding the user's vehicle, such as on the left side, right side, in front, and behind the user's vehicle. The vehicle monitoring application can identify cars passing on each side of the vehicle. The vehicle monitoring application on the user device can also determine other violations or other issues caused by slower drivers. Additionally, these other violations may not solely correspond to violations occurring in a left lane. For example, the vehicle monitoring system can detect that vehicles are passing the perpetrator's vehicle (e.g., the vehicle moving too slowly) on the right of a multi-lane highway. Further, the user's vehicle is not necessarily in the far left lane to detect the slower vehicle, because even in a middle lane, the slower driver may be causing larger vehicles, such as semi-trucks, to enter the left lane to pass the slower vehicle. Semi-trucks moving into the left lane can cause issues. The advantage of the systems and methods described herein can thus be applied to multiple scenarios of monitoring and identifying slower vehicles causing traffic issues.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods, and computer program products are described for monitoring vehicles and detecting potential traffic violations through a user device at a user's vehicle. Example user devices include personal computers, mobile communication devices, and other devices that can acquire image data and can send and receive data over a network. The subject matter addresses the technical challenges of providing and implementing a vehicle monitoring application at a user device located within the vehicle that can be used within a vehicle monitoring system to determine if a second vehicle is violating a traffic violation.

The technologies described in this document can benefit any type of vehicle. In particular, technologies described in this document can benefit any type of vehicle that is used on road ways with one or more additional vehicles. For brevity, the description that follows refers to a particular road violation, e.g., detecting a slow vehicle in a left lane of a multilane roadway, but the description is also applicable to monitoring vehicle traffic and detecting other traffic violations.

These features and additional features are described in more detail below.

Figure 1:
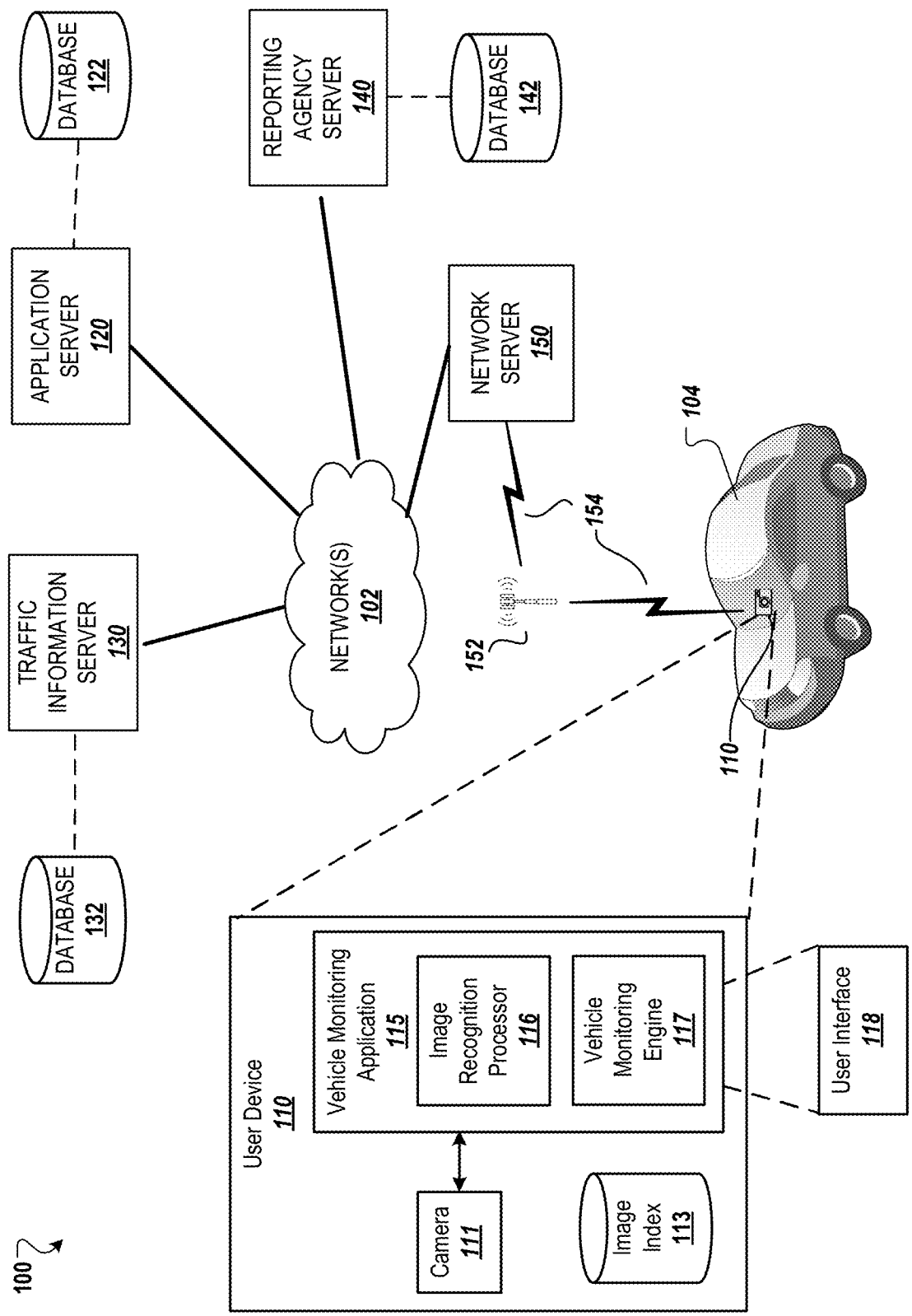
FIG. 1 is a block diagram of an example vehicle monitoring system.

FIG. 1 is a block diagram of an example vehicle monitoring system 100. The vehicle monitoring system 100 includes a network 102, such as a local area network (LAN), a wide area network (WAN), the Internet, or a combination thereof. The network 102 connects a traffic information server 130, a user device 110 through a network server 150, an application server 120, and a reporting agency server 140. The vehicle monitoring system 100 may include many different traffic information servers 130, user devices 110, network servers 150, application servers 120, and reporting agency servers 140. The application server 120 may represent a combination of application servers, database servers, communication servers, web servers, and the like that comprise the systems of the application provider used to collect data from and communicate with various user devices 110 through a vehicle monitoring application 115.

The vehicle monitoring application 115 can be installed on and/or executed by a user device 110. A user device 110 is an electronic device that is capable of sending and receiving data over a data communication network 102. Example user devices 110 include smart phones, tablet computing devices, wearable computing devices (e.g., smart watches), and other devices that can send and receive data over the network 102.

A user device 110 typically includes a user application to facilitate the sending and receiving of data over the network 102. For example, web browsers or native applications executed by the user device 110 can facilitate the sending and receiving of data over the network 102. An application executing on a user device 110 can include an application environment, e.g., a graphical user interface (GUI) 118, in which images may be shown. Examples of such applications are camera-enabled applications that can use an on-device camera, such as camera 111, to capture an image, applications that can receive images and display images, and applications that can access and display images that are stored on the user device 110. For example, an application may have access to a repository of image data 113 stored on the mobile device 110, where the application environment can load an image from the image data 113. Each image of the image data 113 can include location data, a timestamp, or the like. In some implementations, the embedded data in the image data 113 can be used by the processes described herein.

The vehicle monitoring application 115 can be implemented as a native application developed for a particular platform or a particular device, a browser-based application that provides a web interface, or another appropriate type of application. The vehicle monitoring application 115 performs object recognition on an image or a plurality of image frames within an application environment on the mobile device 110. For example, the vehicle monitoring application 115 can include an image recognition processor 116 that attempts to detect and recognize (e.g., identify) objects in pixel data (or images). The image recognition processor 116 can detect various objects, such as people, barcodes, landmarks, paintings, vehicles, and/or other types of objects using edge detection and/or other object recognition techniques. In particular, for the process of detecting a slow vehicle in a left lane of a roadway, the image recognition processor 116 can detect other vehicles and particular roadway features, such as the number of vehicular traffic lanes, lane width, lane traffic direction, and lane marker types that may signify a left lane (e.g., solid white line, double yellow lines, a guard rail, or a high occupancy vehicle (HOV) lane with double white lines). The image recognition processor 116 can access the displayed image data by means of an application programing interface (API).

The vehicle monitoring application 115 can perform tasks or services for a user of the mobile device 110. For example, the vehicle monitoring application 115 can respond to voice commands of the user (e.g., start a vehicle monitoring process). To make it easier and more efficient for the user to implement a vehicle monitoring process, the vehicle monitoring application 115 can present controls on the GUI 118 of a display of the mobile device 110. In some implementations, the vehicle monitoring application 115 can determine that the vehicle is in a driving mode, and automatically initiate a vehicle monitoring process by activating the camera of the user device, and continuously monitoring the image data to determine if the user is driving in the left lane and to detect if another vehicle is within the predetermined distance in front of the user's vehicle.

In operation, a camera 111 of the user device 110 is presented with a view in a forward direction relative to the user's vehicle 104. In some implementations, the user device 110 can be coupled to the vehicle with a mounting device. In some implementations, a manufacturer of the user's vehicle 104 can include the vehicle monitoring application 115 in an on board computing system, and include one or more fixed cameras on the user's vehicle 104 such that the cameras can view the surrounding vicinity of the user's vehicle 104.

The vehicle monitoring application 115 can attempt to detect roadway feature information and vehicles in image data received from a camera 111 of the mobile device 110, e.g., continuously without receiving a user request to initiate a vehicle monitoring process. For example, the vehicle monitoring application 115 can detect and/or recognize objects in a viewfinder of a camera 111 of the mobile device 110 (based on the image data) and interpret the fact that the user device is pointing the camera 111 at a roadway as a request to initiate a vehicle monitoring process.

Figure 4A:
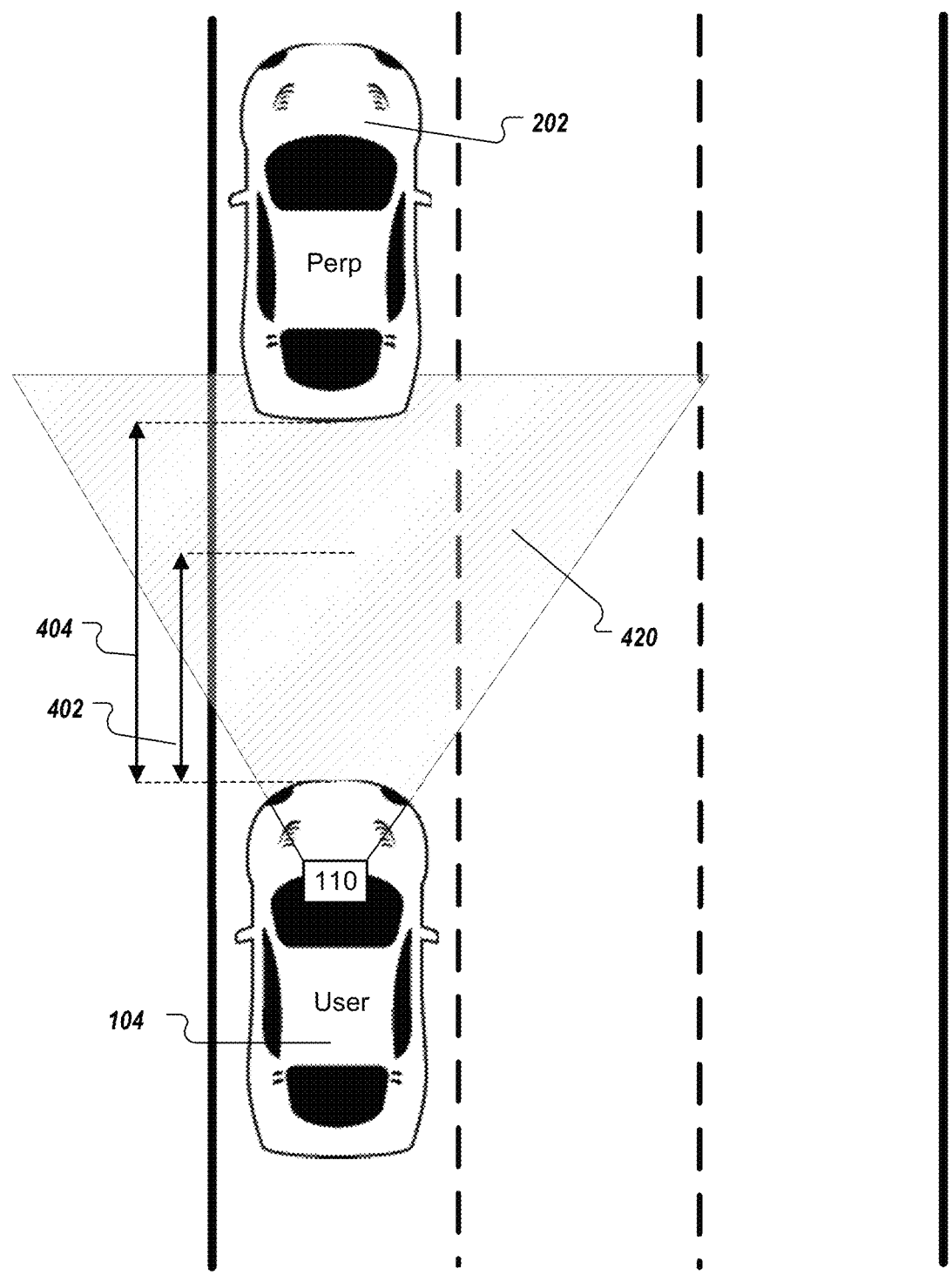
FIGS. 4A-4B illustrate various aspects of an example of a detection process.
Figure 4B:
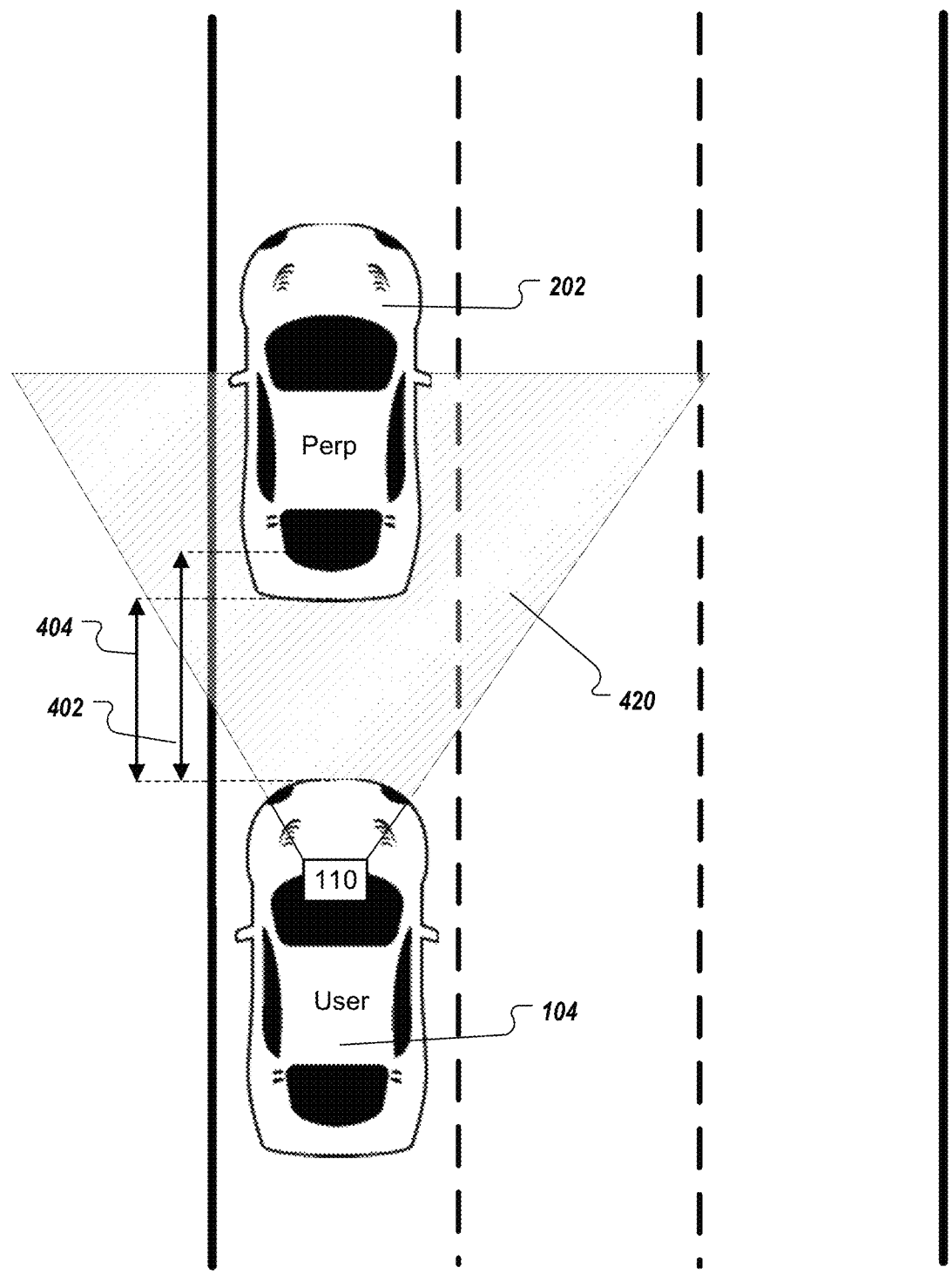

The vehicle monitoring application 115 includes a vehicle monitoring engine 117 that receives identified object data from the image recognition processor 116 to analyze identified objects in the image data and initiate a vehicle monitoring process. As used herein, the term engine refers to software and/or hardware that performs a set of tasks, such as a data processing apparatus that performs the operations discussed herein. For example, for the process of detecting a slow vehicle in a left lane of a roadway, the vehicle monitoring engine 117 receives identified object data from image recognition processor 116 and can determine that the user's vehicle is traveling in a left lane of a multi-lane roadway having at least two lanes for travel in a first direction. The vehicle monitoring engine 117 can then detect, based on the identified object data from image recognition processor 116 identifying a vehicle, whether a vehicle is traveling within a predetermined distance (e.g., approximately an average car length of a vehicle or some other predefined distance, such as 2 meters, 3 meters, or any appropriate distance) in front of the user's vehicle and in the left lane of the roadway. An example of detecting whether a vehicle is traveling within a predetermined distance is illustrated in FIGS. 4A-4B.

Figure 9:
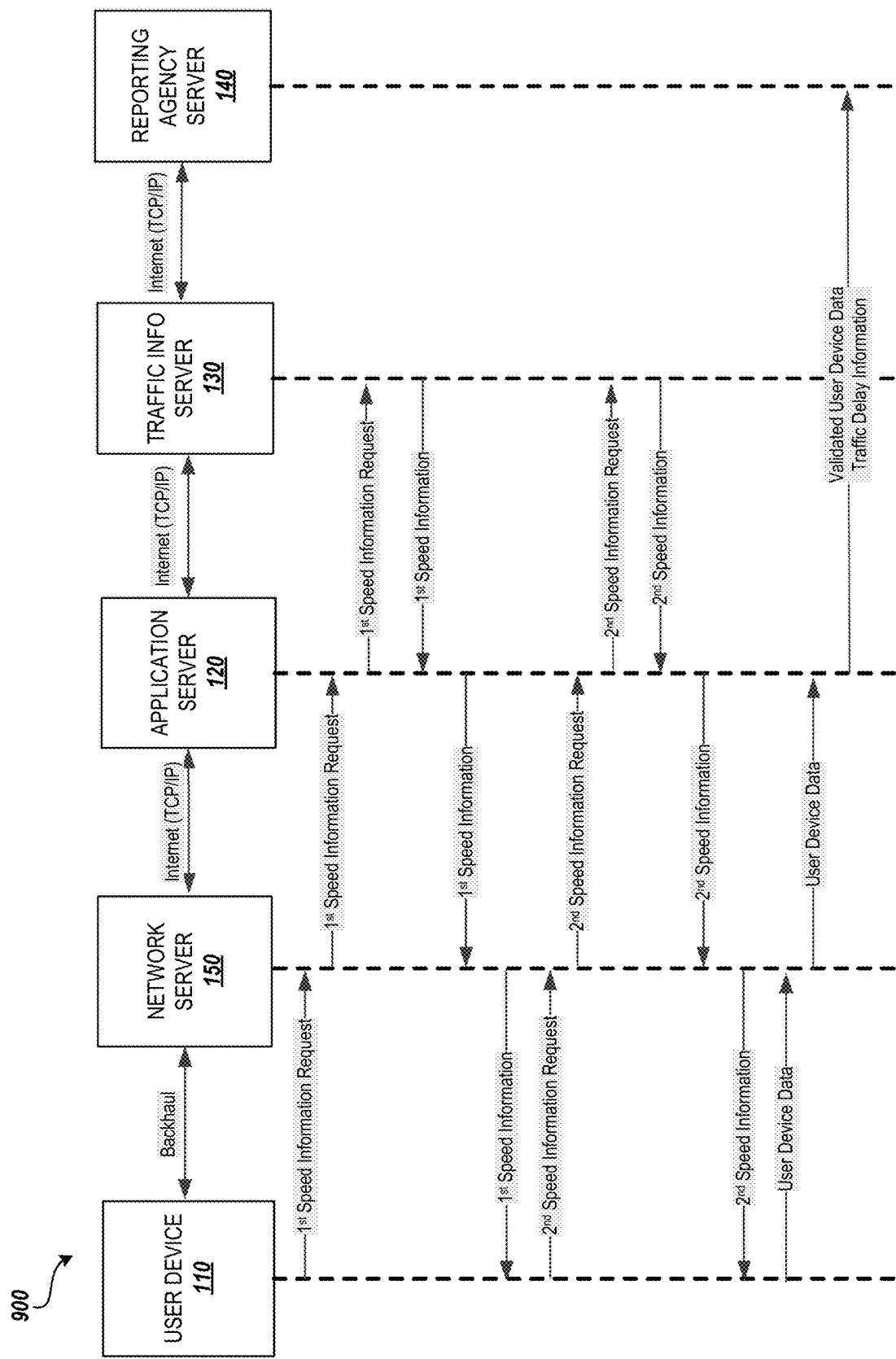
FIG. 9 illustrates a timing diagram of a method for exchanging data in an example vehicle monitoring system, according to examples of the present disclosure.

The vehicle monitoring engine 117 can initiate communication from the user device 110 to a plurality of servers, such as the application server 120, the traffic information server 130, or the reporting agency server 140. For example, for the process of detecting a slow vehicle in a left lane of a roadway, if the vehicle monitoring engine 117 determines that another vehicle is traveling within a predetermined distance and within a left lane, the vehicle monitoring engine 117 can then initiate a process of obtaining speed information of the user's vehicle and the second vehicle by requesting the information from the traffic information server 130. An example of a timing diagram of a method for how the vehicle monitoring engine 117 requests and receives speed information from the traffic information server 130 is illustrated in FIG. 9.

Figure 6:
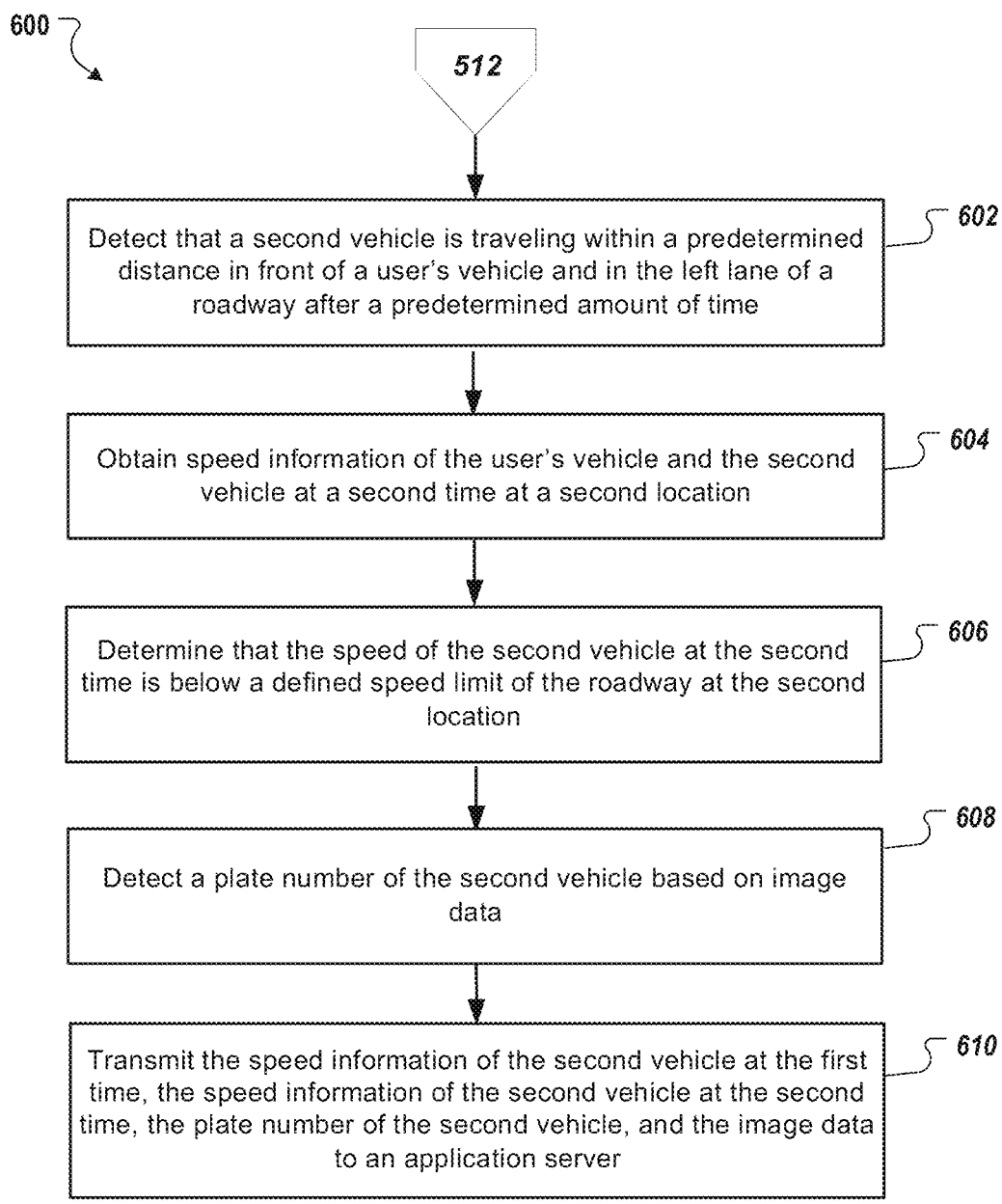
FIG. 6 is a flowchart of an example process for executing a potential violation procedure in a vehicle monitoring system.
Figure 7:
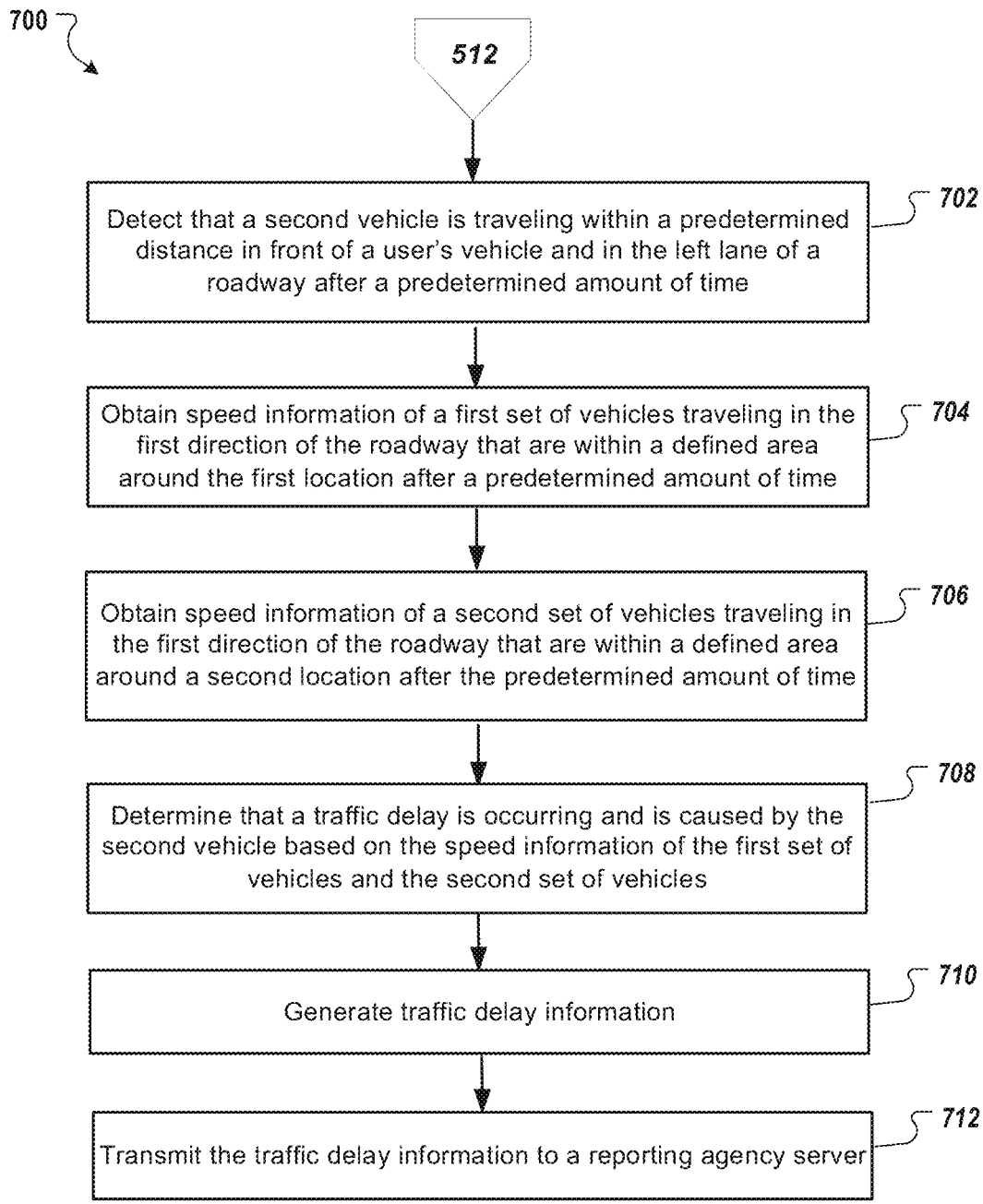
FIG. 7 is a flowchart of an example process for executing a potential violation procedure in a vehicle monitoring system.

The vehicle monitoring engine 117 can further initiate communication from the user device 110 to the plurality of servers, such as the application server 120, the traffic information server 130, or the reporting agency server 140, in order to obtain particular roadway information, such as a speed limit. The vehicle monitoring engine 117 can use the obtained roadway information in the process of detecting a slow vehicle in a left lane of a roadway. For example, the vehicle monitoring engine 117 can compare the speed information of the second vehicle to the speed limit of the roadway at a location of the second vehicle. When the comparison reveals that the speed of the second vehicle at the first time is below a defined speed limit of the roadway at the location of the second vehicle, the vehicle monitoring engine 117 can trigger a potential violation procedure. Examples of a flow diagram of a process for executing a potential violation procedure is illustrated in FIGS. 6 and 7.

The application server 120 is shown being operatively connected to at least one database 122 for storing data, including application data. According to various implementations, the application server 120 may communicate with several devices and/or servers, including one or more user devices 110, a network server 150, a traffic information server 130, and a reporting agency server 140. According to some implementations, a traffic information server 130 may be a separate server, as shown in FIG. 1, or maybe included as part of the application server(s) 120. The traffic information server 130 is shown being operatively connected to a database 132 to store traffic information data. The reporting agency server 140 is shown being operatively connected to a database 142 to store reporting agency data.

The network 102 may include various networking technologies that connect the network server 150 to the application server 120, the traffic information server 130, the reporting agency server 140, including (among others) cellular data networks, Wi-Fi or WiMAX networks, satellite communication networks, metropolitan-area networks (MANs), wide-area networks (WANs), the Internet (TCP/IP), etc. The backhaul system of the network, the connection between the user device 110 and the network server 150, may comprise ethernet, cellular (3G, 4G, 4G LTE, etc.), Wi-Fi or other wireless local area network (LAN) (IEEE 802.11), wired LAN (IEEE 802.3), satellite phone (IRIDIUM), wireless personal area network (WPAN) (IEEE 802.15), or any other telecommunications link, wired or wireless, including those identified above with regard to network 150. As shown in FIG. 1, one implementation includes user device 110 connected through a cellular network 152 via communication links 154.

Processes and examples for detecting a slow vehicle in a left lane of a roadway are now described with reference to FIGS. 2-9 below.

Figure 2:
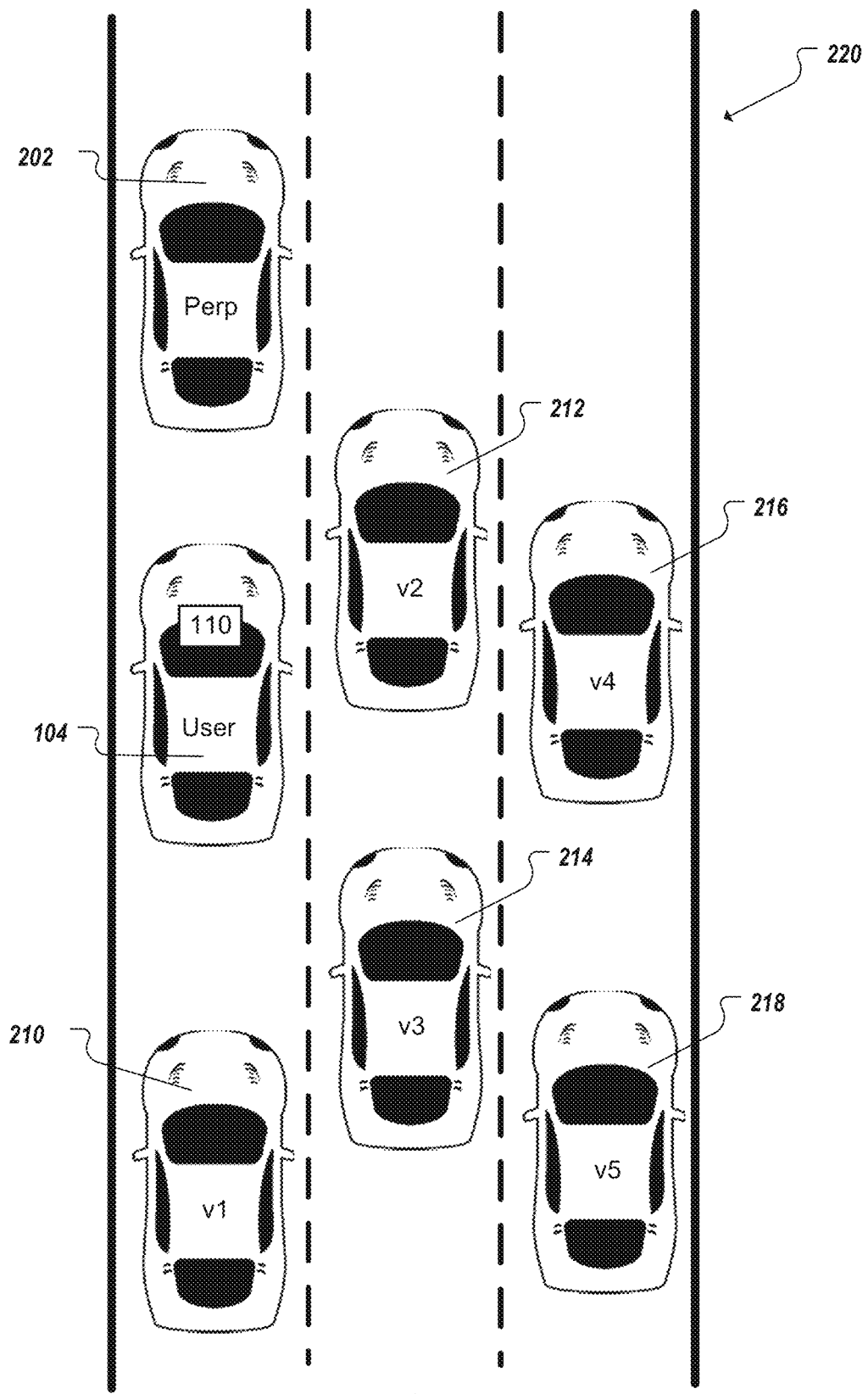
FIG. 2 is an illustration of an example roadway scenario.

FIG. 2 is an illustration of an example roadway scenario. In particular, FIG. 2 displays a slower driver in the left lane, perpetrator vehicle 202, causing traffic delays or traffic congestion, as a plurality of vehicles 104, 210, 212, 214, 216, and 218 are driving along in a same direction on a multi-lane roadway 220. For example, the user's vehicle 104 is attempting to pass vehicle's 212 and 214, which are driving in the middle lane, by driving at a faster speed in the left lane. However, perpetrator vehicle 202 is driving slower than the user's vehicle 104 causing the user to slow down. When a vehicle is caused to slow down in the left lane, this can cause a ripple effect of traffic congestion. For example, when slow drivers linger in the left lane of multi-lane roads, a driver may be forced to pass on the right, causing confusion and disorganization that can lead to accidents. Similarly, when a driver passes on the right, it may require other users to slow down. For example, assume that the vehicle 212 was previously driving in the left lane of FIG. 2 until vehicle 211 approached vehicle 202. Further assume that as the vehicle 212 approached the vehicle 202, vehicle 212 changed lanes from the left lane to the middle lane. In this example, when the vehicle 212 changed lanes into the center lane, this could have caused vehicle 214 to slow down, which would then have the ripple effect of slowing traffic in the center land and possibly the right lane as well. These type of incidents, which can be caused by violation of a slow poke law, can lead to aggressive driving by multiple drivers, which can lead to traffic congestions and vehicular accidents.

Figure 3:
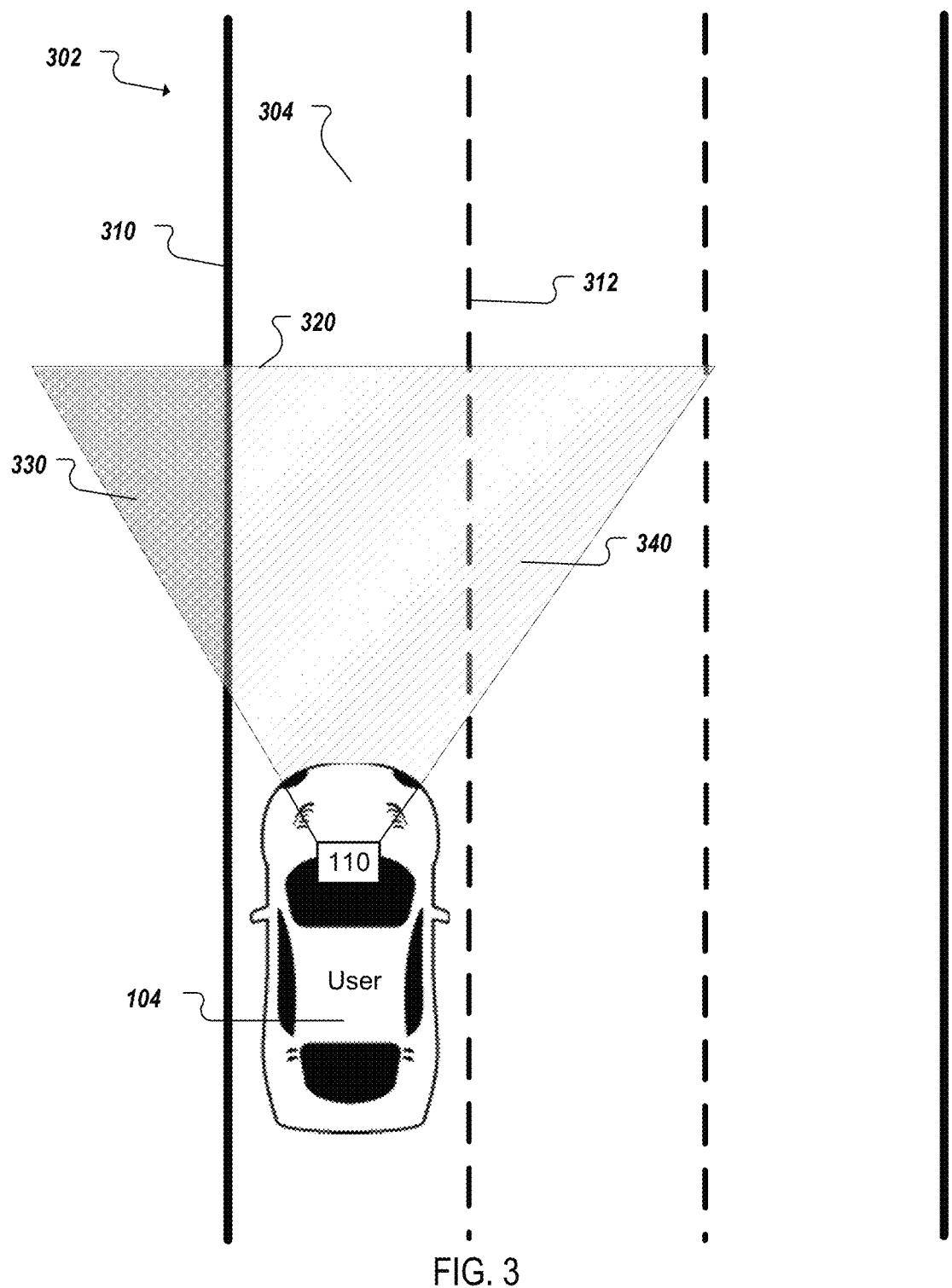
FIG. 3 is an illustration depicting a view captured by a user device.

FIG. 3 is an illustration depicting a view captured by a user device. In this example, the user device 110 is shown as capturing image data (e.g., via camera 111) and detecting whether the user's vehicle 104 is traveling in the left lane 304 of roadway 302. For this particular roadway 302, the far left lane 304 is marked by a solid line 310 on the left side, and a dashed line 312 on the right side, relative to the user's vehicle 104. As the vehicle monitoring system acquires the image data, a determination can continuously (or periodically) be made as to whether the user's vehicle is traveling in a left lane 304 of the roadway 302. According to some implementations, other types of sensors may be used to detect that the user's vehicle 104 is traveling in the left lane.

As illustrated, the shaded area 320 denotes the portion of the roadway 302 that is observed by the vehicle monitoring system. This portion of the roadway can be captured in the form of image data. The image data can include image data representing a view portion 340 that is captured on the right side of the solid line 310. The image data can also include image data representing a different view portion 330 that is captured on the left hand side of the solid line 310. In some situations, the image data for the view portion 330 can be used to identify one or more roadway features, such as signs or other features that are located to the left of the solid line 330. In some situations, the image data for the view portion 330 can be ignored and/or discarded. For example, when the vehicle monitoring system is determining whether a second vehicle is ahead of the user's vehicle, as further discussed herein for FIGS. 4A-4B, the image data for the view portion 330 can be ignored.

As the vehicle monitoring system acquires the image data from the field of view of the camera on the mobile device 110, a repository of image data 113 is stored on the mobile device 110. For example, while the user's vehicle 104 is in operation, a collection of image data can be stored. The image data can be used in real time for the operation of the vehicle monitoring system described herein. According to some implementations, the image data can be stored and accessed at a later time by the vehicle monitoring application 115, or application server 120. For example, if the vehicle monitoring system is being used to collect data on particular vehicle that is driving erratically in front of the user's vehicle, then all of the image data with the erratic vehicle in the field of view of the camera can be accessed and sent to a reporting agency server 140.

FIGS. 4A and 4B illustrate various aspects of an example of a detection process. In particular, FIG. 4A shows an example with a second vehicle 202 in front of a user's vehicle 104, but at a distance 404 greater than a predetermined distance 402. FIG. 4B shows an example with a second vehicle in front of a user's vehicle 104, but at a distance 404 that is equal to or less than the predetermined distance 402. The shaded area 420 denotes the portion of the roadway 302 that is observed by the vehicle monitoring system using the image data. The predetermined distance 402 is used by the vehicle monitoring system to determine whether the second vehicle 402 (or another vehicle) is too close to the user's vehicle 104. For example, the predetermined distance 402 can be set at 10 meters, which is approximately twice an average car length or some other appropriate distance. In the present example, 10 meters is used as an example of a distance at which a user is likely to begin to slow down due to the second vehicle 202 driving at slower speeds. Alternatively, other distances can be used for the predetermined distance 402.

Figure 5:
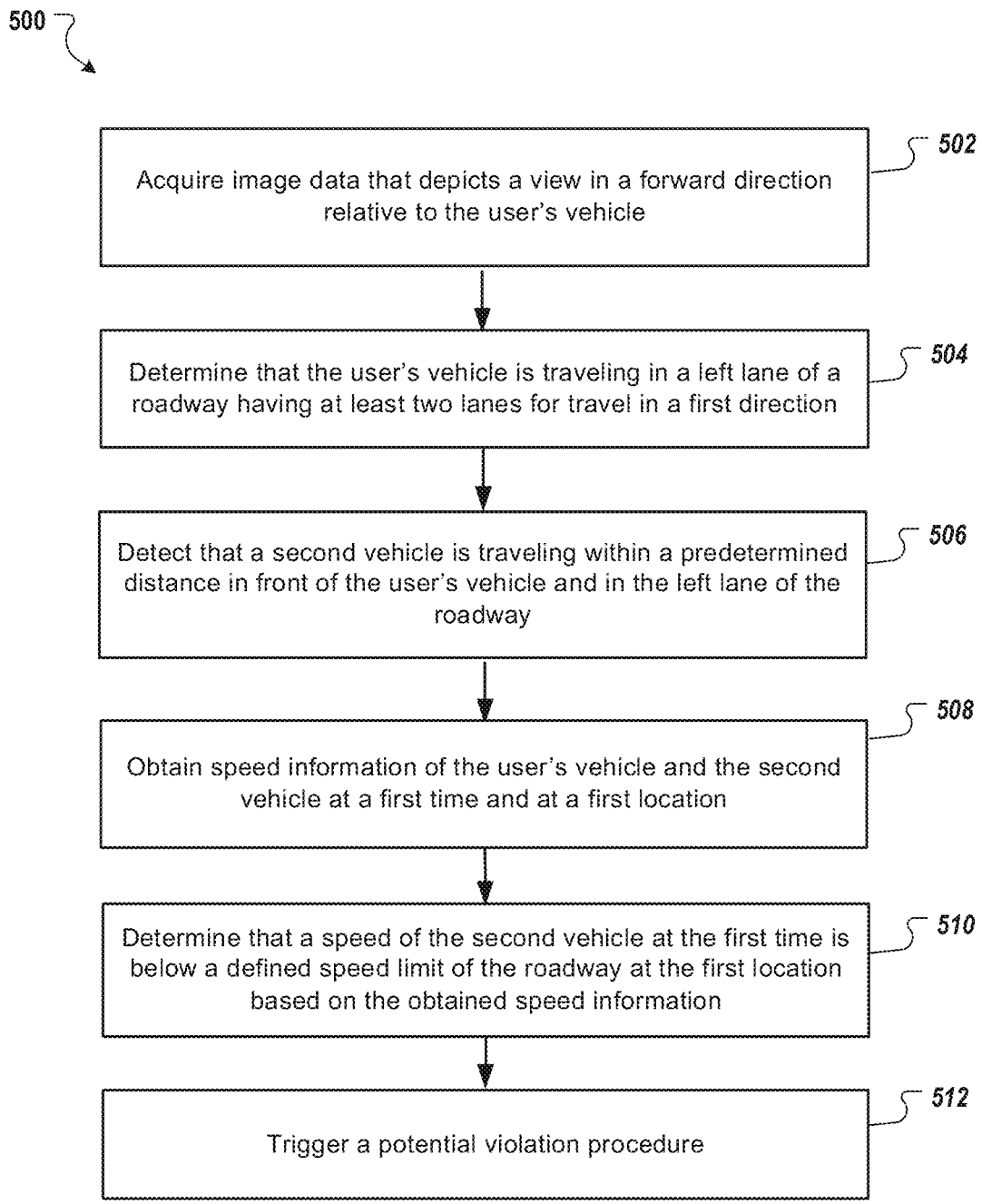
FIG. 5 is a flowchart of an example process for triggering a potential violation procedure in a vehicle monitoring system.

FIG. 5 is a flowchart of an example process 500 for triggering a potential violation procedure in a vehicle monitoring system. The process 500 can be implemented, for example, by the vehicle monitoring system 100 of FIG. 1. Operations of the process 500 can also be implemented as instructions stored on non-transitory computer readable media, and execution of the instructions be one or more data processing apparatus can cause the one or more data processing apparatus to perform the operations of the process 500.

The process 500 acquires image data that depicts a view in a forward direction relative to the user's vehicle (502). The image data can be acquired by a camera of a user's device. For example, as shown in FIG. 1, camera 111 of user device 110 can be used to acquire the image data, where user device 110 is located within or attached to user's vehicle 104. As shown in FIG. 3, a camera view of the user device 110 is shown facing forward relative to the vehicle 104.

The process 500 determines that the user's vehicle is traveling in a left lane of a roadway having at least two lanes for travel in a first direction (504). For example, as shown in FIG. 3, assume that the user's vehicle 104 is traveling in the left lane 304 of a multi-lane roadway 302. In this example, the vehicle monitoring application 115 on the user device 110 is able to determine the vehicle 104 is in the left lane based on the image data. In some implementations, object recognition can be performed on the image data to determine that the user's vehicle is traveling in the left lane of the roadway. For example, the object recognition can enable the vehicle monitoring application 115 to determine that a particular roadway feature indicative of travel in the left lane is positively identified in the image data. In some situations, the particular roadway feature that leads to the determination that the user's vehicle is traveling in the left lane can include, but is not limited to, a solid white line, double yellow lines, a guard rail, a high occupancy vehicle (HOV) lane with double white lines, or the like. For instance, when the object recognition identifies one of these particular roadway features at specific locations in the image data, the conclusion can be made that the user's vehicle is traveling in the left lane. More specifically, the vehicle monitoring application 115 can conclude that the user's vehicle is traveling in the left lane when any of the roadway features listed above are determined to be located on a left side of the image captured by the user device 110.

The process 500 detects that a second vehicle is traveling within a predetermined distance in front of the user's vehicle and in the left lane of the roadway (506). The image recognition processor 116 can analyze the image data to detect that one or more vehicles are present within the viewing area of the camera. The vehicle monitoring engine 117 can then determine, based on the image data, that a second vehicle is in the left lane in front of the user's vehicle 104, and determine the distance between the two vehicles. For example, as shown in FIG. 4B, the closest portion of the perpetrator's vehicle 202 (e.g., the rear bumper) relative to the front portion of the user's vehicle 104 (e.g., the front bumper), is equal to or less than the predetermined distance 402. Thus, the image recognition processor 116 detected a vehicle, perpetrator's vehicle 202, within the viewing area of the camera, shown as shaded area 420. The vehicle monitoring engine 117 can analyze the image data with the detected vehicle to determine that the perpetrator's vehicle 202 is within the predetermined distance 402.

The process 500 obtains speed information of the user's vehicle and the second vehicle at a first time and at a first location (508). The vehicle monitoring engine 117 can initiate a process of obtaining speed information of the user's vehicle and the second vehicle. For example, the system can obtain and use a current speed of the user's vehicle 104 through communication with the user's vehicle 104 on board computing system. After obtaining the current speed, the system can use the image data and determine that a change in distance over time relative to the other car to determine the speed of that other car. For example, FIG. 4A shows the perpetrator's vehicle 202 at distance 404 at a first time, and FIG. 4B shows the perpetrator's vehicle 202 at a second distance 404 at a second time. The vehicle monitoring system can then determine the approximate speed of the perpetrator's vehicle 202. For example, the vehicle monitoring system can determine a difference in the distance 404 between the vehicle 104 and the vehicle 202 between the first time and the second time. That difference in distance in combination with the amount of time that elapsed between the first time and the second time can be used to compute the difference in distance over time. That difference in distance over time can then be converted into an equivalent difference in miles per hour or kilometers per hour, which can represent the difference in speed between the two vehicles 104 and 202. This difference in speed can be used along with the speed of the vehicle 104 to determine the speed of the vehicle 202. More specifically, assume that over a 10 second interval, vehicle 104 gains 100 m on the vehicle 202 (e.g., meaning that the distance difference between the first time and the second time is 100 m). Thus, the vehicle 104 is traveling 36 km/hour faster than the vehicle 202. Assuming that the vehicle 104 is traveling at 89 km/hour, this means that the vehicle 202 is traveling 53 km per hour. If the speed limit is 80 km/hour, the vehicle 202 is travelling well under the speed limit.

In some implementations, the system may obtain speed information by requesting the information from the traffic information server 130. An example of a timing diagram of a process for requesting and receiving speed information from the traffic information server 130 is illustrated in FIG. 9.

In some implementations, the system may obtain speed information from one or more sensors (e.g., LIDAR, monocular or stereoscopic cameras, and/or RADAR) connected to or within the vehicle in lieu of, or in addition to, obtaining speed information from the image data or a traffic information server. The one or more sensors may be mounted to or attached to the vehicle. Additionally, or alternatively, the speed information may be extrapolated by the user device by using communications with the user's vehicle. For example, if the user's vehicle maintains the same distance behind the second vehicle and is traveling 35 mph, then the vehicle monitoring system can then determine the second vehicle is traveling at that same speed.

The process 500 determines that a speed of the second vehicle at the first time is below a defined speed limit of the roadway at the first location based on the obtained speed information (510). For example, the speed information obtained from the traffic information server 130, can also include the defined speed limit of the roadway at the particular location the speed information was obtained. Other processes of obtaining a speed limit may be used by the vehicle monitoring application 115. For example, the vehicle monitoring application 115 may be able to access GPS mapping application data stored on the user's device. Additionally, the vehicle monitoring application 115 may request the information from the application server 120 or traffic information server 130. In some implementations, the image recognition processor 116 could analyze the image data for roadway signs that display the speed limit at specific locations the speed information is obtained.

The process 500 triggers a potential violation procedure (512). According to the example implementations, the potential violation is a violation of a slow poke law, i.e., driving too slow in a left lane of a multi-lane roadway. Alternatively or additionally, other violation procedures may be used using the vehicle monitoring system 100. FIGS. 6 and 7 each provide an example process for executing a potential violation procedure of step 512 detecting a slow vehicle in a left lane of a roadway.

FIG. 6 is a flowchart of an example process for executing a potential violation procedure in a vehicle monitoring system. The process 600 can be implemented, for example, by the vehicle monitoring system 100 of FIG. 1. Operations of the process 600 can also be implemented as instructions stored on non-transitory computer readable media, and execution of the instructions be one or more data processing apparatus can cause the one or more data processing apparatus to perform the operations of the process 600.

The process 600 detects that a second vehicle is traveling within a predetermined distance in front of a user's vehicle and in the left lane of a roadway after a predetermined amount of time (602). For example, as shown in FIG. 4B, the perpetrator's vehicle 202 is within the predetermined distance 402. According to the process 600, the vehicle monitoring application 115 will wait for a predetermined amount of waiting time, e.g. thirty seconds, and again determine if the second vehicle is still within the predetermined distance 402. When the perpetrator's vehicle 202 is still within the predetermined distance 402 after the predetermined amount of waiting time, the process 600 continues to 604. The predetermined amount of time may be any time interval, e.g., 15 seconds, 30 seconds, 1 minute, or any other time interval set within or by the vehicle monitoring application. This delay allows a perpetrator vehicle, e.g., a driver temporarily driving slowly in the left lane, the opportunity to move over and out of the left lane such that a false positive is not triggered by the vehicle monitoring application 115. When the vehicle monitoring application 115 determines that the second vehicle is no longer within the predetermined distance 402 after the predetermined amount of waiting time, the potential violation procedure can terminate without reporting the potential violation.

Speed information of the user's vehicle and the second vehicle are obtained at a second time at a second location (604).

The speed of the second vehicle at the second time is determined (606). Obtaining the speed information and the defined speed limit of the roadway at the second location may be similar to the steps discussed herein for steps 508 and 510, respectively. However, the additional speed information is now obtained for an additional point in time, i.e., after the predetermined amount of time, and at a second location. The vehicle monitoring application 115 can determine that the speed of the second vehicle is below a defined speed limit of the roadway at the second location based on a comparison of the speed information and the defined speed limit of the roadway. When the vehicle monitoring application 115 determines that the speed of the second vehicle is below the defined speed limit of the roadway, the process 600 can proceed to 608. When the vehicle monitoring application 115 determines that the speed of the second vehicle is above the defined speed limit of the roadway, the process 600 can terminate without reporting the potential violation.

A plate number of the second vehicle is detected based on image data (608). According to some implementations, the plate number can be detected from the image data by an image recognition process, such as optical character recognition (OCR) or the like, performed by the image recognition processor 116 at the user device 110. In some implementations, the image data can be sent to and processed by the application server 120 to detect the plate number. According to some implementations, detecting the plate number can include detecting the plate number from a first image or a subsequently acquired image when the plate number is not detected in the first image. For example, the vehicle monitoring system 100 can determine whether the first image acquired of the plate of the second vehicle displays a readable image, or if an additional image needs to be acquired in order to recognize the plate number.

The process 600 transmits the speed information of the second vehicle at the first time, the speed information of the second vehicle at the second time, the plate number of the second vehicle, and the image data to an application server (610). For example, as shown in FIG. 1, the user device 110, using the vehicle monitoring application 115, can send user device data (e.g., the speed information of the second vehicle at the first time, the speed information of the second vehicle at the second time, the plate number of the second vehicle, and the image data, and the like) through the network server 150 to the application server 120 over the network 102.

FIG. 7 is a flowchart of an example process for executing a potential violation procedure in a vehicle monitoring system. The process 700 can be implemented, for example, by the vehicle monitoring system 100 of FIG. 1. Operations of the process 700 can also be implemented as instructions stored on non-transitory computer readable media, and execution of the instructions be one or more data processing apparatus can cause the one or more data processing apparatus to perform the operations of the process 700.

The process 700 detects that a second vehicle is traveling within a predetermined distance in front of a user's vehicle and in the left lane of a roadway after a predetermined amount of time (702). For example, as shown in FIG. 4B, the perpetrator's vehicle 202 is within the predetermined distance 402. According to the process 700, the vehicle monitoring application 115 will wait for a predetermined amount of waiting time, e.g. thirty seconds, and again determine if the second vehicle is still within the predetermined distance 402. When the perpetrator's vehicle 202 is still within the predetermined distance 402 after the predetermined amount of waiting time, the process 700 continues to 704. The predetermined amount of time may be any time interval, e.g., 15 seconds, 30 seconds, 1 minute, or any other time interval set within or by the vehicle monitoring application. As discussed herein, this delay can be any amount of time the vehicle monitoring system 100 has implemented for the specific application being used. For detecting a slower driver in a left lane, at least some amount of delay may be necessary to reduce the amount of violations that may only be occurring for short amount of time, e.g., less than five seconds, which may not be impacting traffic. When the vehicle monitoring application 115 determines that the second vehicle is no longer within the predetermined distance 402 after the predetermined amount of waiting time, the potential violation procedure can terminate without reporting the potential violation.

Figure 8A:
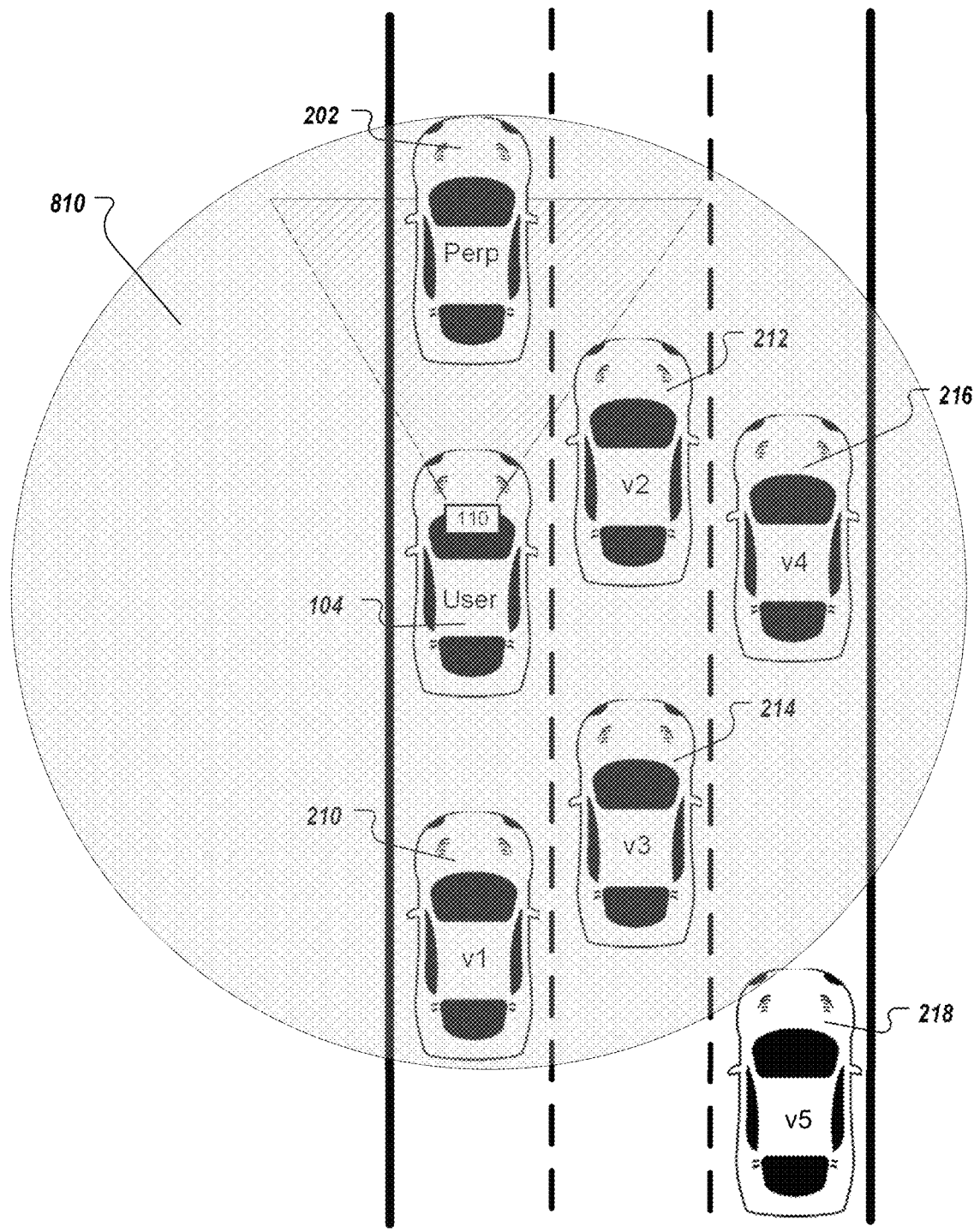
FIGS. 8A-8B each show an example detection process of an example road scenario.

Speed information of a first set of vehicles traveling in the first direction of the roadway that are within a defined area around the first location are obtained after a predetermined amount of time (704). For example, FIG. 8A shows an example detection process of an example road scenario with a shaded area 810 with an arcuate shape around the center of user's vehicle 104. Obtaining the speed information of a first set of vehicles may include each vehicle 104, 202, 210, 212, 214, and 216 traveling in the same direction of the user's vehicle and are each within the shaded area 810. In some implementations, obtaining the speed information is sent by request to the traffic information server 130. Using GPS coordinates, or the like, the traffic information server 130 sends the speed information for each vehicle within the defined area.

Figure 8B:
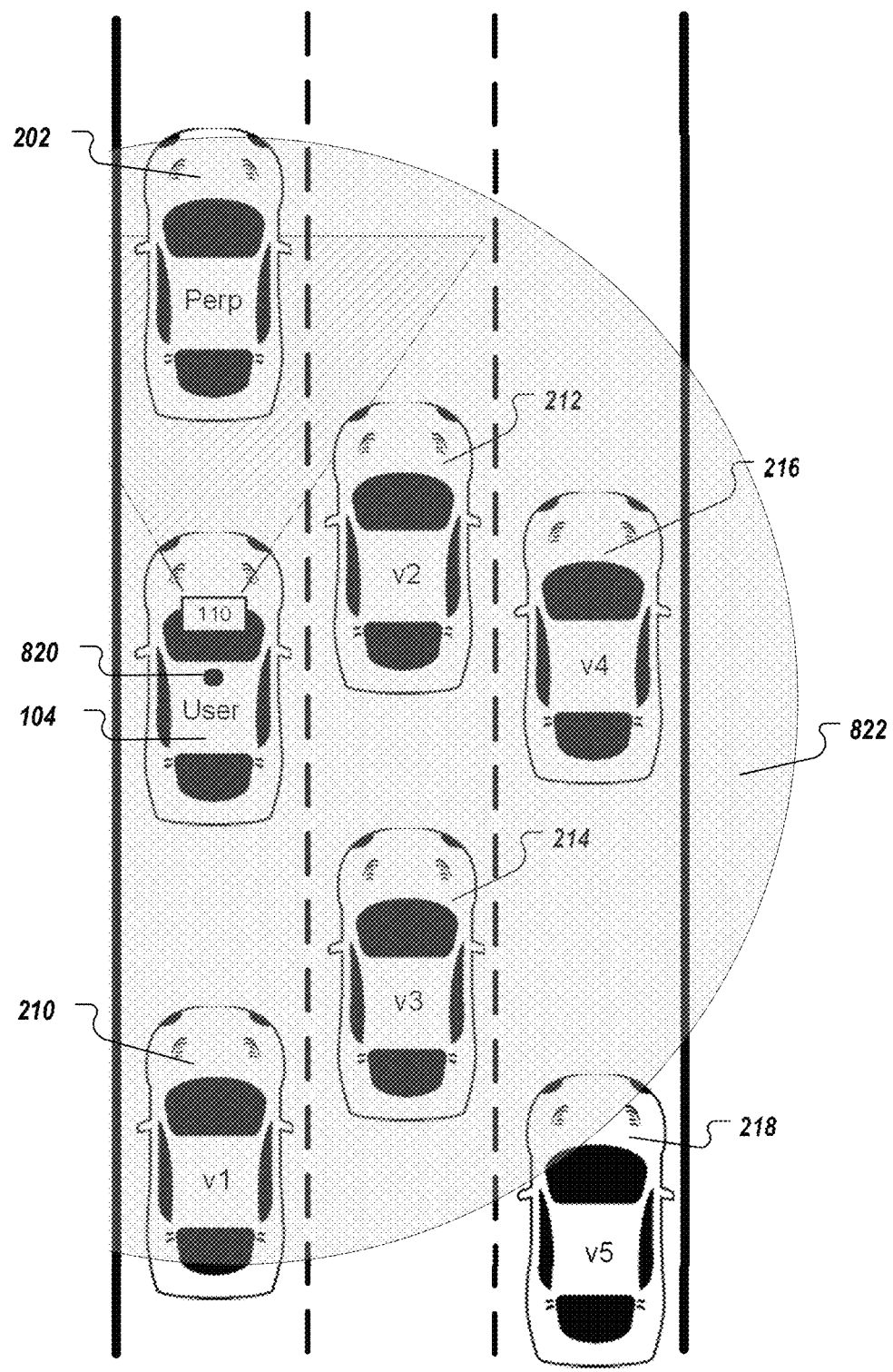

According to some implementations, a sensor, such as a LIDAR, may be used to obtain the speed information. For example, FIG. 8B shows an example detection process of an example road scenario with a user's vehicle equipped with a sensor 820 used to detect speed information of surrounding objects, such as vehicles 202, 210, 212, 214, and 216 traveling in the same direction of the user's vehicle. The shaded area 822 represents the coverage area that the sensor 820 is able to detect and obtain speed information of all surrounding objects. As shown in FIG. 8B, shaded area 822 has an arcuate shape around the sensor 820, but shaded area 822 is not extending past the left lane because the vehicle monitoring system is obtaining speed information for vehicles traveling in the same direction of the user's vehicle 104. Thus, only vehicles in the left lane and in the lanes to the right of the user's vehicle 104.

A LIDAR device, such as sensor 820, can actively estimate distances to objects in an environment, such as vehicles 202, 210, 212, 214, and 216 in FIG. 8B. A LIDAR can scan a particular area of an environment, such as shaded area 822, and accumulate a plurality of point positions indicative of a three-dimensional shape, such as a vehicle. For example, individual points can be measured by generating a laser pulse and detecting a returning pulse, if any, reflected from an object, and determining the distance to the reflective object according to the time delay between the emitted pulse and the reception of the reflected pulse. The laser, or set of lasers, can be rapidly and repeatedly used across an environment to provide continuous distances to reflective objects in the scene. A three-dimensional map of points of reflective features can be generated based on returning pulses. The three-dimensional point map can indicate positions of reflective objects in the scanned environment. To detect a speed of a vehicle in the shaded area 822, a plurality of target points that correspond to a target surface of a target vehicle can be identified in the set of spatial points. The plurality of target points can include a first point indicative of a first location on the target surface obtained by the LIDAR device at a first time and a second point indicative of a second location on the target surface obtained by the LIDAR device at a second time. A speed of the target vehicle can be estimated based on the first location, the first time, the second location, and the second time. For example, the difference between the target vehicle's location over the time interval can be used along with the speed of the user's vehicle can be used to determine the speed of the target vehicle in a manner similar to that described above.

Speed information of a second set vehicles traveling in the first direction of the roadway that are within a defined area around a second location are obtained after the predetermined amount of time (706). According to the process 700, the vehicle monitoring application 115 will wait for a predetermined amount of waiting time, and then obtain an additional data set of speed information. For example, after thirty seconds, if the perpetrator's vehicle 202 is still within the predetermined distance 402, then process 700 continues. The predetermined amount of time may be any time interval, e.g., 15 seconds, 30 seconds, 1 minute, or any other time interval set by the vehicle monitoring application. This time delay allows a perpetrator vehicle, e.g., a driver temporarily driving slowly in the left lane, the opportunity to move over and out of the left lane such that a false positive is not triggered by the vehicle monitoring application 115. When the vehicle monitoring application 115 determines that the second vehicle is no longer within the predetermined distance 402 after the predetermined amount of waiting time, the potential violation procedure can terminate without reporting the potential violation.

A determination is made that a traffic delay is occurring and is caused by the second vehicle based on the speed information of the first set of vehicles and the second set of vehicles (708). For example, the vehicle monitoring application 115 can send all of the information obtained from the first and second set of vehicles and send that information to the application server 120 to analyze and determine whether traffic delays were caused by the perpetrator vehicle 202. When the vehicle monitoring application 115 determines that there is a traffic delay and is caused by the second vehicle, the process 700 can proceed to 710. When the vehicle monitoring application 115 determines that there is no traffic delay, or the traffic delay is not caused by the second vehicle, the process 700 can terminate without reporting the potential violation.

In response to determining the traffic delay has occurred, traffic delay information is generated (710). The traffic delay information can include the speed information of the first set of vehicles and the second set of vehicles, the speed information of the second vehicle at the first time, the speed information of the second vehicle at the second time, the plate number of the second vehicle, and the image data. For example, the application server 120 determines whether traffic delays were caused by the perpetrator vehicle 202 based on the analysis of the obtained speed information from the user device 110. In some implementations, the vehicle monitoring application 115 operating on the user device can make the determination that traffic delays were caused by the perpetrator vehicle 202.

Traffic delay information is transmitted to a reporting agency server (712). For example, if the application server 120 determines that traffic delays were caused by the perpetrator vehicle 202, the application server 120 can send the traffic delay information to a reporting agency server 140. For example, FIG. 9 illustrates a timing diagram of a method for exchanging data in an example vehicle monitoring system, including sending user device data to the application server 120, and sending traffic delay information to a reporting agency server 140.

FIG. 9 illustrates a timing diagram 900 of a method for exchanging data in an example vehicle monitoring system, such as vehicle monitoring system 100 of FIG. 1, according to examples of the present disclosure. As described herein, for some implementations, the vehicle monitoring application 115 may obtain speed information from a traffic information server, such as traffic information server 130. The timing diagram 900 illustrates these type of communication messages for obtaining speed information. Additionally, or alternatively, timing diagram 900 illustrates sending communication messages, such as traffic delay information, from a user device 110 to a reporting agency server, such as reporting agency server 140.

As shown in FIG. 9, the user device 110 sends a message packet with a speed information request to the network server 150 through the network server provider's backhaul, and then the network server 150 sends the request message to the application server 120 over the network, such as network 102 (e.g., via TCP/IP). The application server 120 then sends the request message to the traffic information server 130 over the network. The traffic information server 130 then receives the speed information request and sends a response with the applicable speed information to the application server 120. The application server 120 then sends the speed information to the user device 110 through the network server 150. This process of obtaining speed information from the traffic information server 130 may be repeated, as necessary, to process a potential violation procedure as described herein.

Additionally, as described in FIG. 7, the vehicle monitoring system can compile traffic delay information and send the information to a reporting agency, who can in turn, report the traffic delays caused by the driver or owner of the perpetrator's vehicle and/or issue a citation for a violation, if applicable. For example, as shown in FIG. 9, the user device 110 sends a message packet with user device data (e.g., the obtained traffic information) to the network server 150 through the network server provider's backhaul, and then the network server 150 sends the data message to the application server 120 over the network. The application server 120 analyzes and can also validate the user device data to determine that a traffic delay was caused by the perpetrator's vehicle and/or a violation occurred, and the application server 120 can send the validated user device data and compiled traffic delay information to the reporting agency server 140 over the network.

In some implementations, speed information may be obtained for an additional set of vehicles traveling in the first direction of the roadway that are within a defined area around the first location after an additional predetermined amount of time. The vehicle monitoring system 100 may use this additional information for additional traffic delay information to provide to a driver of a perpetrator vehicle 202 that would illustrate that the driver's slow driving in the left lane at the first location, caused vehicles to travel a lower speed at that same first location several minutes later.

In some implementations, one or more sensing devices are connected to the vehicle for monitoring a plurality of other vehicles surrounding the user's vehicle and a perpetrator's vehicle when the perpetrator's vehicle and the other vehicles are within the range of the sensing devices. The one or more sensing devices can monitor surrounding vehicles located on every side of the user's vehicle, and the vehicle monitoring application can identify cars passing on each side of the vehicle. Additionally, or alternatively, the vehicle monitoring application 115 on the user device can determine other violations or other issues caused by slower drivers. These other violations may not solely correspond to violations occurring in a left lane. For example, the vehicle monitoring system can detect that vehicles are passing the perpetrator's vehicle (e.g., the vehicle moving too slowly) on the right side of the perpetrator's vehicle of a multi-lane highway. Further, the user's vehicle is not necessarily in the far left lane to detect the slower vehicle, because even in a middle lane, the slower driver may be causing larger vehicles, such as semi-trucks, to enter the left lane to pass the slower vehicle. Semi-trucks moving into the left lane can cause issues. The vehicle monitoring system 100 may use this additional information for additional traffic delay information to provide to a driver of a perpetrator vehicle 202 that would illustrate that the driver's slow driving in the left lane at the first location, caused vehicles to travel a lower speed at that same first location several minutes later.

Figure 10:
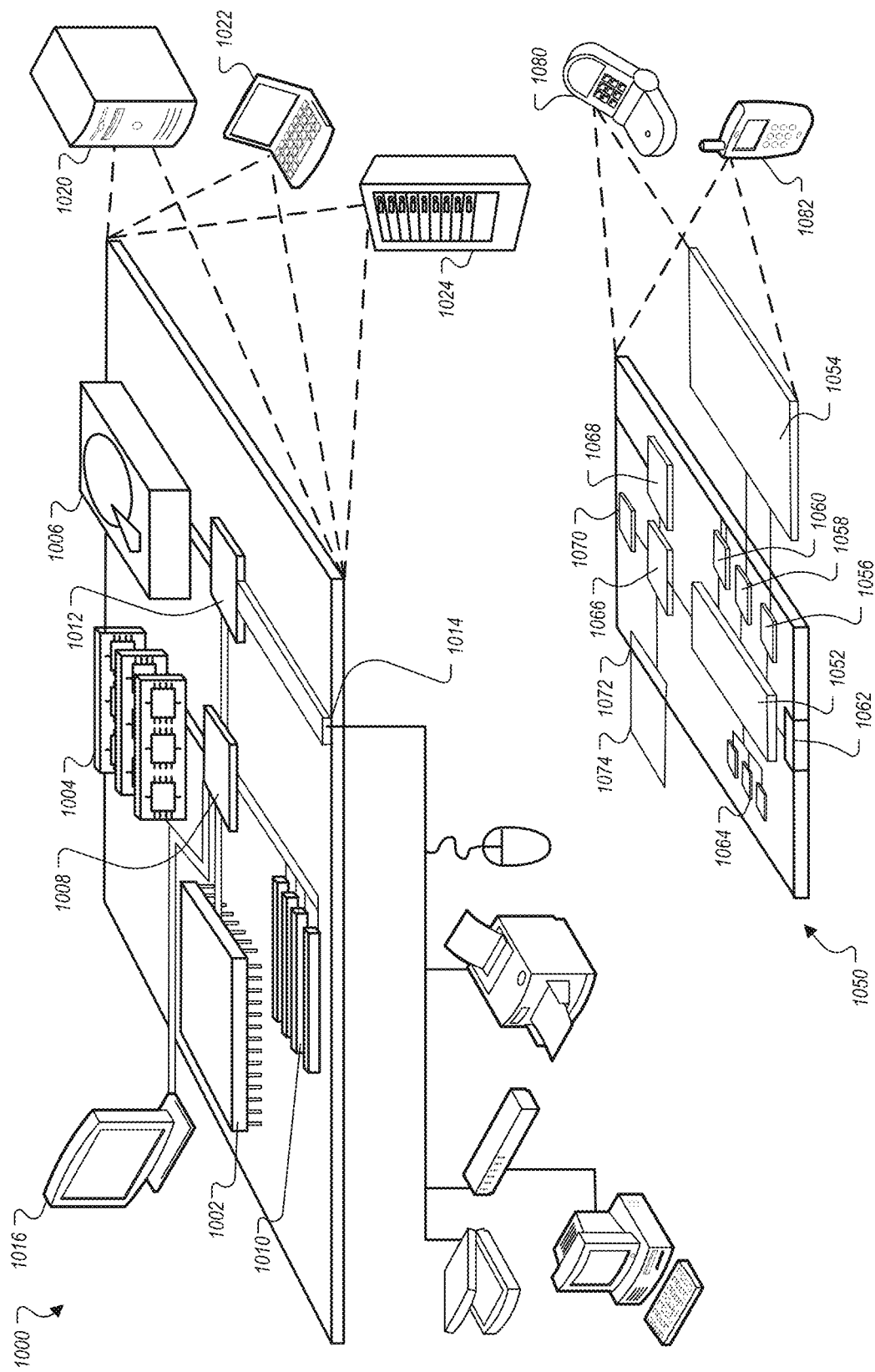
FIG. 10 is a block diagram of an example computing devices that can be used to implement the methods, systems and processes described in this disclosure.

FIG. 10 is a block diagram of example computing devices 1000, 1050 that can be used to implement the systems and methods described in this document, as either a client or as a server or plurality of servers. Computing device 1000 is intended to represent various forms of digital computers, such as laptops, desktops, workstations, personal digital assistants, servers, blade servers, mainframes, and other appropriate computers. Computing device 1000 is further intended to represent any other typically non-mobile devices, such as televisions or other electronic devices with one or more processers embedded therein or attached thereto. Computing device 1050 is intended to represent various forms of mobile devices, such as personal digital assistants, cellular telephones, smartphones, and other computing devices. The components shown here, their connections and relationships, and their functions, are meant to be examples only, and are not meant to limit implementations of the disclosures described and/or claimed in this document.

Computing device 1000 includes a processor 1002, memory 1004, a storage device 1006, a high-speed controller 1008 connecting to memory 1004 and high-speed expansion ports 1010, and a low-speed controller 1012 connecting to low-speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a graphical user interface (GUI) on an external input/output device, such as display 1016 coupled to high-speed controller 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high-speed controller 1008 manages bandwidth-intensive operations for the computing device 1000, while the low-speed controller 1012 manages lower bandwidth-intensive operations. Such allocation of duties is an example only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed bus 1014. The low-speed bus 1014 (e.g., a low speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as computing device 1050. Each of such devices may contain one or more of computing devices 1000, 1050, and an entire system may be made up of multiple computing devices 1000, 1050 communicating with each other.

Computing device 1050 includes a processor 1052, memory 1064, an input/output device such as a display 1054, a communication interface 1076, and a transceiver 1068, among other components. The computing device 1050 may also be provided with a storage device, such as a micro-drive or other device, to provide additional storage. Each of the components 1050, 1052, 1064, 1054, 1076, and 1068, are interconnected using various buses, and several of the components may be mounted on a common motherboard or in other manners as appropriate.

The processor 1052 can process instructions for execution within the computing device 1050, including instructions stored in the memory 1064. The processor may also include separate analog and digital processors. The processor may provide, for example, for coordination of the other components of the computing device 1050, such as control of user interfaces, applications run by computing device 1050, and wireless communication by computing device 1050.

Processor 1052 may communicate with a user through control interface 1058 and display interface 1056 coupled to a display 1054. The display 1054 may be, for example, a TFT LCD display or an OLED display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of computing device 1050 with other devices. External interface 1062 may provide, for example, for wired communication (e.g., via a docking procedure) or for wireless communication (e.g., via Bluetooth® or other such technologies).

The memory 1064 stores information within the computing device 1050. In one implementation, the memory 1064 is a computer-readable medium. In one implementation, the memory 1064 is a volatile memory unit or units. In another implementation, the memory 1064 is a non-volatile memory unit or units. Expansion memory 1074 may also be provided and connected to computing device 1050 through expansion interface 1072, which may include, for example, a subscriber identification module (SIM) card interface. Such expansion memory 1074 may provide extra storage space for computing device 1050, or may also store applications or other information for computing device 1050. Specifically, expansion memory 1074 may include instructions to carry out or supplement the processes described above, and may include secure information also. Thus, for example, expansion memory 1074 may be provide as a security module for computing device 1050, and may be programmed with instructions that permit secure use of computing device 1050. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052.

Computing device 1050 may communicate wirelessly through communication interface 1076, which may include digital signal processing circuitry where necessary. Communication interface 1076 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 1068 (e.g., a radio-frequency transceiver). In addition, short-range communication may occur, such as using a Bluetooth®, WiFi, or other such transceiver (not shown). In addition, GPS receiver module 1070 may provide additional wireless data to computing device 1050, which may be used as appropriate by applications running on computing device 1050.

Computing device 1050 may also communicate audibly using audio codec 1060, which may receive spoken information from a user and convert it to usable digital information. Audio codec 1060 may likewise generate audible sound for a user, such as through a speaker, e.g., in a handset of computing device 1050. Such sound may include sound from voice telephone calls, may include recorded sound (e.g., voice messages, music files, etc.) and may also include sound generated by applications operating on computing device 1050.

The computing device 1050 may be implemented in a number of different forms, as shown in the figure. For example, it may be implemented as a cellular telephone 1080. It may also be implemented as part of a smartphone 1082, personal digital assistant, or other mobile device.

In situations in which the systems discussed here collect personal information about users, or may make use of personal information, the users may be provided with an opportunity to control whether applications or features collect user information (e.g., information about a user's social network, social actions or activities, profession, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a user computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any features or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The term "traffic lane" is used herein to broadly include any type of lane (e.g., unpaved surface, sidewalk, crossings, pedestrian walks, road, street, highway, freeway, truckway, vehicle lane, bicycle lane, bus lane, tram lane, rail road, acceleration lane, merge lane, deceleration lane, turn lane, passing lane, climbing land, crawler lane, operational lane, auxiliary lane, ramp, shoulder, emergency lane, breakdown lane, transfer lane, express lane, collector lane, dedicated lane, carpool lane, toll lane, parking lane, fire lane, and slow lane) for a moving object to travel.

What is claimed is:
1. A method for detecting a slow vehicle, the method comprising:
  obtaining first speed information of a first vehicle at a first time and at a first location;

determining, based on the obtained first speed information, that a speed of the first vehicle at the first time is below a defined speed limit at the first location;

detecting, after a predetermined amount of time, that the first vehicle is traveling within a predetermined distance of a second vehicle;

obtaining second speed information of the first vehicle at a second time and at a second location;

determining, based on the obtained second speed information, that the speed of the first vehicle at the second time is below the defined speed limit at the second location; and generating information about the first vehicle based on one or more of the first speed information or the second speed information.

2. The method of claim 1, further comprising:
determining that the first vehicle is traveling in a same lane as a second vehicle;
detecting a plate number of the first vehicle; and
transmitting, to an application server, the plate number of the first vehicle.

3. The method of claim 1, wherein one or more of obtaining the first speed information or obtaining the second speed information is performed through communication between one or more vehicles.

4. The method of claim 1, further comprising determining that one or more vehicles are passing the first vehicle, wherein transmitting information identifying the first vehicle is further based on the determination that the one or more vehicles are passing the first vehicle.

5. The method of claim 1, wherein:
obtaining the first speed information of the first vehicle at the first time comprises obtaining the first speed information using one or more sensors;
obtaining the second speed information of the first vehicle at the second time comprises obtaining the second speed information using one or more sensors; and
transmitting the information about the vehicle to an application server, including transmitting information identifying the vehicle to the application server.

6. The method of claim 5, wherein:
obtaining the first speed information using one or more sensors comprises obtaining the first speed information using one or more of LIDAR, a camera, or radar; and
obtaining the second speed information using one or more sensors comprises obtaining the second speed information using one or more of LIDAR, a camera, or radar.

7. The method of claim 1, further comprising:
determining a lane of travel for the second vehicle, wherein transmitting the second speed information of the first vehicle is conditioned on the lane of travel for the first vehicle being other than a right-most lane of travel.

8. A system comprising:
a data storage device; and
one or more processors configured to interact with the data storage device and perform, upon execution of instructions, operations comprising:
obtaining first speed information of a first vehicle at a first time and at a first location;
determining, based on the obtained first speed information, that a speed of the first vehicle at the first time is below a defined speed limit at the first location;
detecting, after a predetermined amount of time, that the first vehicle is traveling within a predetermined distance of a second vehicle;

obtaining second speed information of the first vehicle at a second time and at a second location;

determining, based on the obtained second speed information, that the speed of the first vehicle at the second time is below the defined speed limit at the second location; and generating information about the first vehicle based on one or more of the first speed information or the second speed information.

9. The system of claim 8, wherein the instructions cause the one or more processors to perform operations further comprising:
determining that the first vehicle is traveling in a same lane as a second vehicle;
detecting a plate number of the first vehicle; and
transmitting, to an application server, the plate number of the first vehicle.

10. The system of claim 8, wherein one or more of obtaining the first speed information or obtaining the second speed information is performed through communication between one or more vehicles.

11. The system of claim 8, wherein the instructions cause the one or more processors to perform operations further comprising determining that one or more vehicles are passing the first vehicle, wherein transmitting information identifying the first vehicle is further based on the determination that the one or more vehicles are passing the first vehicle.

12. The system of claim 8, wherein:
obtaining the first speed information of the first vehicle at the first time comprises obtaining the first speed information using one or more sensors;
obtaining the second speed information of the first vehicle at the second time comprises obtaining the second speed information using one or more sensors; and
the instructions cause the one or more processors to perform operations further comprising: and
transmitting the information about the vehicle to an application server, including transmitting information identifying the vehicle to the application server.

13. The system of claim 12, wherein:
obtaining the first speed information using one or more sensors comprises obtaining the first speed information using one or more of LIDAR, a camera, or radar; and
obtaining the second speed information using one or more sensors comprises obtaining the second speed information using one or more of LIDAR, a camera, or radar.

14. The system of claim 8, wherein the instructions cause the one or more processors to perform operations further comprising:
determining a lane of travel for the second vehicle, wherein transmitting the second speed information of the first vehicle is conditioned on the lane of travel for the first vehicle being other than a right-most lane of travel.

15. A non-transitory computer readable medium storing instructions that, upon execution, cause one or more processors to perform operations comprising:
obtaining first speed information of a first vehicle at a first time and at a first location;
determining, based on the obtained first speed information, that a speed of the first vehicle at the first time is below a defined speed limit at the first location;
detecting, after a predetermined amount of time, that the first vehicle is traveling within a predetermined distance of a second vehicle;
obtaining second speed information of the first vehicle at a second time and at a second location;

determining, based on the obtained second speed information, that the speed of the first vehicle at the second time is below the defined speed limit at the second location; and generating information about the first vehicle based on one or more of the first speed information or the second speed information.

16. The non-transitory computer readable medium of claim 15, wherein the instructions cause the one or more processors to perform operations further comprising:
   determining that the first vehicle is traveling in a same lane as a second vehicle;
   detecting a plate number of the first vehicle; and
   transmitting, to an application server, the plate number of the first vehicle.

17. The non-transitory computer readable medium of claim 15, wherein one or more of obtaining the first speed information or obtaining the second speed information is performed through communication between one or more vehicles.

18. The non-transitory computer readable medium of claim 15, wherein the instructions cause the one or more processors to perform operations further comprising determining that one or more vehicles are passing the first vehicle, wherein transmitting information identifying the first vehicle is further based on the determination that the one or more vehicles are passing the first vehicle.

19. The non-transitory computer readable medium of claim 15, wherein:
   obtaining the first speed information of the first vehicle at the first time comprises obtaining the first speed information using one or more sensors;
   obtaining the second speed information of the first vehicle at the second time comprises obtaining the second speed information using one or more sensors; and
   the instructions cause the one or more processors to perform operations further comprising:
   and
   transmitting the information about the vehicle to an application server, including transmitting information identifying the vehicle to the application server.

20. The non-transitory computer readable medium of claim 19, wherein:
   obtaining the first speed information using one or more sensors comprises obtaining the first speed information using one or more of LIDAR, a camera, or radar; and
   obtaining the second speed information using one or more sensors comprises obtaining the second speed information using one or more of LIDAR, a camera, or radar.

* * * * *